US010452429B2

(12) United States Patent
Konnath et al.

(10) Patent No.: US 10,452,429 B2
(45) Date of Patent: Oct. 22, 2019

(54) COMPUTER SYSTEM MAINTENANCE WITH TOPOLOGY DATA

(71) Applicant: Oracle International Corporation, Redwood City, CA (US)

(72) Inventors: Vikas Krishna Kallalathil Konnath, Irving, TX (US); Manoj Kumar Sharma, San Ramon, CA (US)

(73) Assignee: Oracle International Corporation, Redwood City, CA (US)

( * ) Notice: Subject to any disclaimer, the term of this patent is extended or adjusted under 35 U.S.C. 154(b) by 222 days.

(21) Appl. No.: 15/694,322

(22) Filed: Sep. 1, 2017

(65) Prior Publication Data
US 2019/0073239 A1    Mar. 7, 2019

(51) Int. Cl.
*G06F 9/46* (2006.01)
*G06F 9/48* (2006.01)
*G06F 9/451* (2018.01)

(52) U.S. Cl.
CPC .............. *G06F 9/485* (2013.01); *G06F 9/451* (2018.02)

(58) Field of Classification Search
CPC ................................. G06F 9/485; G06F 9/451
USPC .............................................................. 718/1
See application file for complete search history.

(56) References Cited

U.S. PATENT DOCUMENTS

2016/0105350 A1\*  4/2016  Greifeneder .......... H04L 41/046
                                                                709/224

\* cited by examiner

*Primary Examiner* — Camquy Truong

(57) ABSTRACT

A computer system maintains its computer system components. In an exemplary embodiment, of the computer system, a topology engine generates topology data to individually correlate hardware components, virtual machines, databases, middleware services, and applications based on hardware execution data. A hardware controller determines when a virtual machine stop condition for a virtual machine is met based on the topology data. When the virtual machine stop condition is met, the hardware controller instructs a hardware component to stop the virtual machine. The hardware controller determines when a virtual machine start condition for a virtual machine is met based on the topology data. When the virtual machine start condition is met, the hardware controller instructs a hardware component to start the virtual machine.

20 Claims, 8 Drawing Sheets

| DC | HW | VM | PDB | CDB | NCDB | EMAIL | APP SRV | DB SRV | WEB | CONTENT | SOCIAL | SALES | R&D | HR |
|---|---|---|---|---|---|---|---|---|---|---|---|---|---|---|
| A | 301 |   |   |   |   |   |   |   |   |   |   |   |   |   |
|   | 302 |   |   |   |   |   |   |   |   |   |   |   | A |   |
|   | 303 | A |   |   |   |   |   |   |   |   |   |   |   |   |
|   | 310 |   |   |   |   |   |   |   |   |   |   |   |   | A |
|   | 311 |   |   |   | A |   |   |   |   |   |   |   |   |   |
|   | 312 |   | A | A |   | A | A | A | A | A | A | A |   |   |
| B | 304 |   |   |   |   |   |   |   |   |   |   |   |   |   |
|   | 305 | B |   |   |   |   |   |   |   |   |   |   |   |   |
|   | 306 |   |   |   | B |   |   |   |   |   |   |   |   |   |
|   | 313 |   |   |   |   | B | B | B | B | B | B |   |   |   |
|   | 314 |   | B | B |   |   |   |   |   |   |   |   |   |   |
|   | 315 |   |   |   |   |   |   |   |   |   |   |   |   |   |
|   | 307 |   |   |   |   |   |   |   |   |   |   | A | A | A |
| C | 308 |   |   |   |   |   |   |   |   |   |   |   |   |   |
|   | 309 | C |   |   |   |   |   |   |   |   |   |   |   |   |
|   | 316 |   |   | C | C | C | C | C | C | C | C |   |   |   |
|   | 317 |   |   |   |   |   |   |   |   |   |   |   |   |   |
|   | 318 |   | C |   |   |   |   |   |   |   |   |   |   |   |

TOPOLOGY DATA STRUCUTRE 600

FIGURE 6

COMPUTER SYSTEM MAINTENANCE WITH TOPOLOGY DATA

TECHNICAL BACKGROUND

Business and government entities use computer systems to perform various data operations. The computer systems have both computer hardware and computer software. The computer software directs the computer hardware to host web sites, sales applications, media content, financial databases, customer records, and the like. Over time, these computer systems have grown too large and unwieldy for many operators.

Data center technologies have been introduced to handle this complexity. Data centers deploy large amounts of hardware servers and data storage units that efficiently share support systems like enclosures, cooling, communications, and power. The data centers use advanced software like hypervisors, virtual machines, and middleware to provide a virtual interface between the software applications and the computer hardware. The advanced software allows the software applications to share the computer hardware in an organized manner that meets the computer processing and data storage needs of each application. This hardware sharing typically entails technologies such as virtualization, containerization, or versioning to logically separate the software applications, middleware, databases, and virtual machines that are executing within the shared data centers.

Computer system maintenance is required in these data centers. Software components need to stop and restart to integrate new software features. Hardware components need to stop and restart to clear circuitry. To perform the computer system maintenance, the data centers use orchestration software that directs the hypervisors to stop and restart various software and hardware components. In many computer maintenance situations, a shutdown sequence is observed where some software components must be stopped or started before other software components. For example, a web server is usually stopped before the virtual machines and databases that support the web server are stopped. Another secondary web server and its supporting software components may need to start before the web server stops.

In global data center deployments, the massive level of computer maintenance becomes daunting. Unfortunately, the massive workload is compounded by a scarcity of time, because many maintenance operations are performed under severe time pressure. To handle these issues, computer maintenance personnel have developed maintenance software that directs the computer systems to automatically start and stop the hardware and software components in an orderly manner.

The maintenance software does not handle these massive shutdown and startup operations in an efficient and effective manner. The hypervisors and virtual machines do not provide enough data about their execution environment to support these massive shutdown and startup operations. The software applications themselves are not configured for efficient and effective computer system maintenance.

TECHNICAL OVERVIEW

A computer system maintains its computer system components. In the computer system, a topology engine generates topology data to individually correlate hardware components, virtual machines, databases, middleware services, and applications based on hardware execution data. A hardware controller executes maintenance instructions to determine when a virtual machine stop condition for a virtual machine is met based on the topology data. When the virtual machine stop condition is met, the hardware controller instructs a hardware component to stop the virtual machine. The hardware controller determines when a virtual machine start condition for a virtual machine is met based on the topology data. When the virtual machine start condition is met, the hardware controller instructs a hardware component to start the virtual machine. The databases, middleware services, and applications may be controlled in a similar manner.

DESCRIPTION OF THE DRAWINGS

FIG. 6 illustrates a topology data structure for the distributed computer system that intelligently maintains computer system components using topology data in an exemplary embodiment.

DETAILED DESCRIPTION

Figure 1:
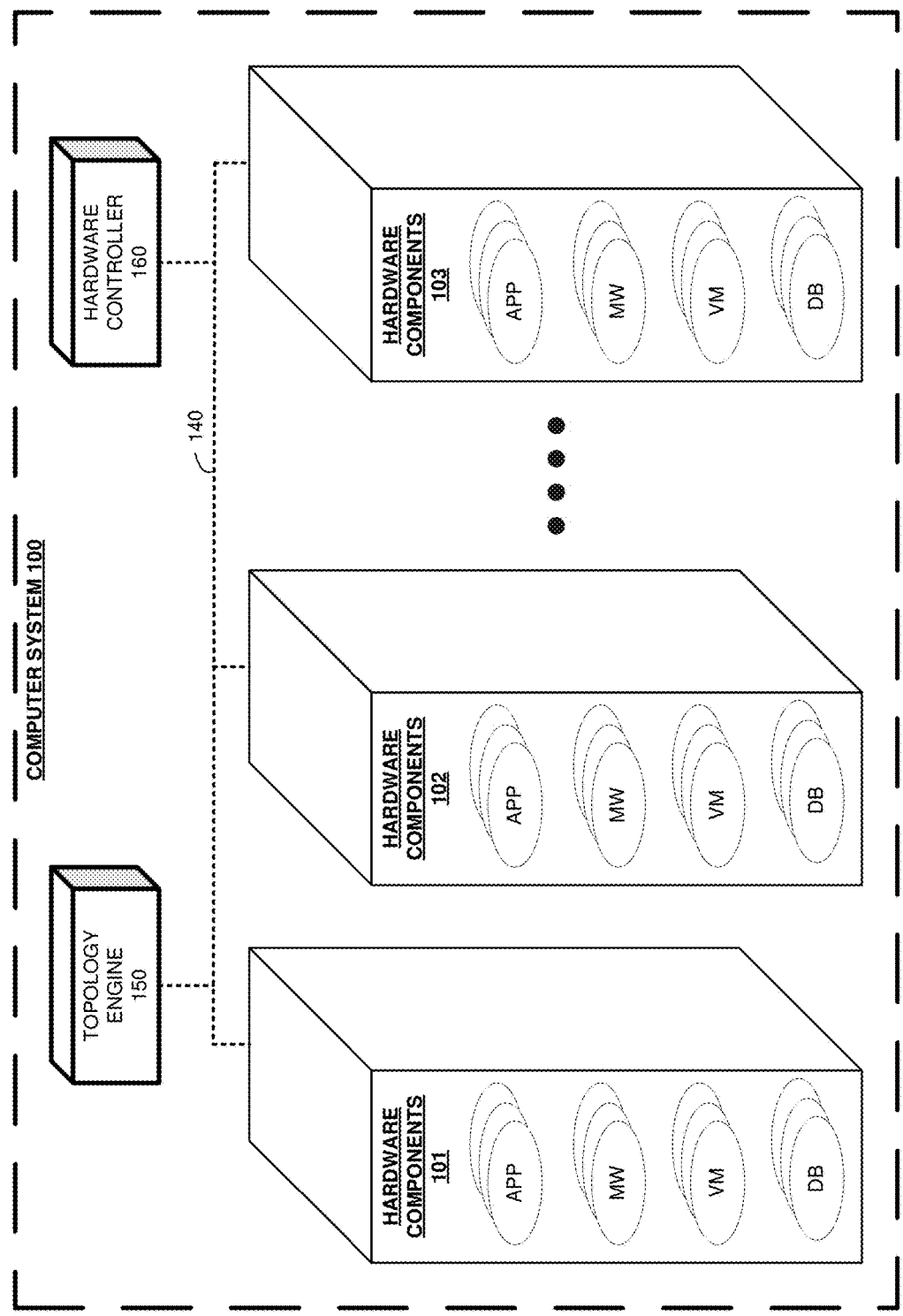
FIG. 1 illustrates a computer system to maintain computer system components using topology data in an exemplary embodiment.

FIG. 1 illustrates computer system 100 to maintain computer system components using topology data in an exemplary embodiment, although the computer system may vary in other embodiments. Computer system 100 comprises hardware components 101-103, data communication system 140, topology engine 150, and hardware controller 160. Hardware components 101-103 execute various software components like Databases (DB), Virtual Machines (VM), Middleware Services (MW), and Applications (APP). The amount of hardware, DBs, VMs, MW, and APPs is typically much higher, and the amount shown is restricted for clarity.

In some exemplary embodiments, several data centers are located across the globe. These data centers handle massive quantities of business and government data operations, such as web sites, content hosting, database access, electronic messaging, social networking, human resources, and sales. Various government and business entities share the superior computing and networking ability of the global data center deployment. The government and business entities also share advanced data services like application servers, web servers, content servers, and database interfaces. As described herein, some embodiments of computer system 100 can intelligently maintain hardware and software components based on topology data in these complex environments.

Hardware components 101-103 comprise computer servers and data storage units. The computer servers are made of central processing units, random access memory, input/output transceivers, persistent data storage, and bus interfaces. The data storage units are made of control circuitry, storage media, and input/output transceivers. Exemplary data storage units include flash drives, disk drives, and the like. Hardware components 101-103 execute computer software like operating systems, hypervisors, memory controllers, and bus managers.

Topology engine 150 and hardware controller 160 each comprise programmed computers with data communications capability. Topology engine 150 and hardware controller 160 cold be integrated together, integrated within hardware components 101-103, or distributed across multiple computers.

To support the user data services, hardware components 101-103 execute the VMs, DBs, MW, and APPs. During start-up and shut down, these software components drive their executing hardware component to report their individual hardware/software execution pairing and status to topology engine 150. For example, a VM might call its hypervisor to drive the hardware server to report the VM/server pairing during start and stop of the VM. Thus, hardware components 101-103 generate and transfer hardware execution data that characterizes their execution of the software components.

Topology engine 150 receives the hardware execution data from hardware components 101-103. Topology engine 150 aggregates the hardware execution data from many software components to generate the topology data for computer system 100. The topology data individually correlates the hardware components, VMs, DBs, MW, and APPs based their actual execution as reported in the hardware execution data. Topology engine 150 will re-generate the topology data in response to hardware execution data that indicates a new VM, new DB, new MW, or new APP. Topology engine 150 usually has a Graphic User Interface (GUI) to allow operators view, edit, and search the topology data.

Computer system maintenance is periodically performed on computer system 100 to optimize performance and improve the delivery of the user data services. In some examples, a specific maintenance task is performed on a relatively small set of software components that are executing on only a few hardware components. In other examples, a general maintenance task is performed on a huge set of software components that are executing in several thousand hardware components—often under time pressure. In some maintenance cases, the software components are re-booted to implement new software versions and features. In other maintenance cases, the hardware components themselves are re-booted to clear circuitry and reinitialize firmware.

These maintenance tasks may become complex and require specific stop and start sequencing for an array of software components. For example, a web server is often stopped before the DB and VM that supports the web server are stopped. The maintenance tasks may require component searches during the operational sequence. For example, a search for a specific application and its host hardware components may be required to stop the application across multiple data centers. The maintenance tasks may require status verification for software components during the sequence. For example, hardware controller 160 can verify the start of a DB using the topology data before starting an APP that uses the DB.

To perform these maintenance tasks, hardware controller 160 executes computer maintenance instructions. Under the direction of the maintenance instructions, hardware controller 160 processes the topology data from topology engine 150 to implement sequences that automatically stop and start the software components. Topology engine 150 serves hardware controller 160 with an accurate data structure that indicates which software components are being executed by which hardware components and that indicates which software components are not executing.

For example, hardware controller 160 may process the topology data to identify the primary hardware servers that are executing a specific APP in a group of data centers. The hardware controller 160 might later process the topology data to verify when the APP has stopped executing in its primary data centers and has started executing in its secondary data centers. The maintenance instructions that are executed by hardware controller 160 are designed to use the topology data to optimize the efficiency and effectiveness of computer system maintenance. Hardware controller 160 usually has a GUI to allow operators view, edit, and search the maintenance instructions.

When executing the maintenance instructions, hardware controller 160 determines when a VM stop condition for an individual VM is met based on the topology data. This determination may require searching and validation operations on the topology data. When the VM stop condition is met, hardware controller 160 instructs the pertinent hardware component to stop the VM. When the VM start condition is met, hardware controller 160 instructs the pertinent hardware component to start the VM. The maintenance instructions may be loaded with numerous conditions for a multitude of VMs. The maintenance instructions may be tightly sequenced for a fast and orderly stop and restart of various hardware and/or software components. The VM stop condition may comprise stopping or starting another DB, VM, MW, APP, or other software component. Likewise, the VM start condition may comprise stopping or starting another DB, VM, MW, APP, or other software component. Hardware controller 160 stops and starts the DBs, MW, and APPs in a like manner.

Hardware components 101-103 stop and start the VMs responsive to the VM stop and start instructions from hardware controller 160. These stop and start instructions are usually issued by an orchestrator in hardware controller 160 to an operating system, hypervisor, or controller in the individual hardware component. Hardware components 101-103 stop and start the DBs, MW, and APPs in a like manner. These software components report their on/off status by executing reporting instructions that are embedded in their start/stop scripts. The reporting instructions may include operating system or hypervisor calls to discover hardware components and send messages to topology engine 150.

Figure 2:
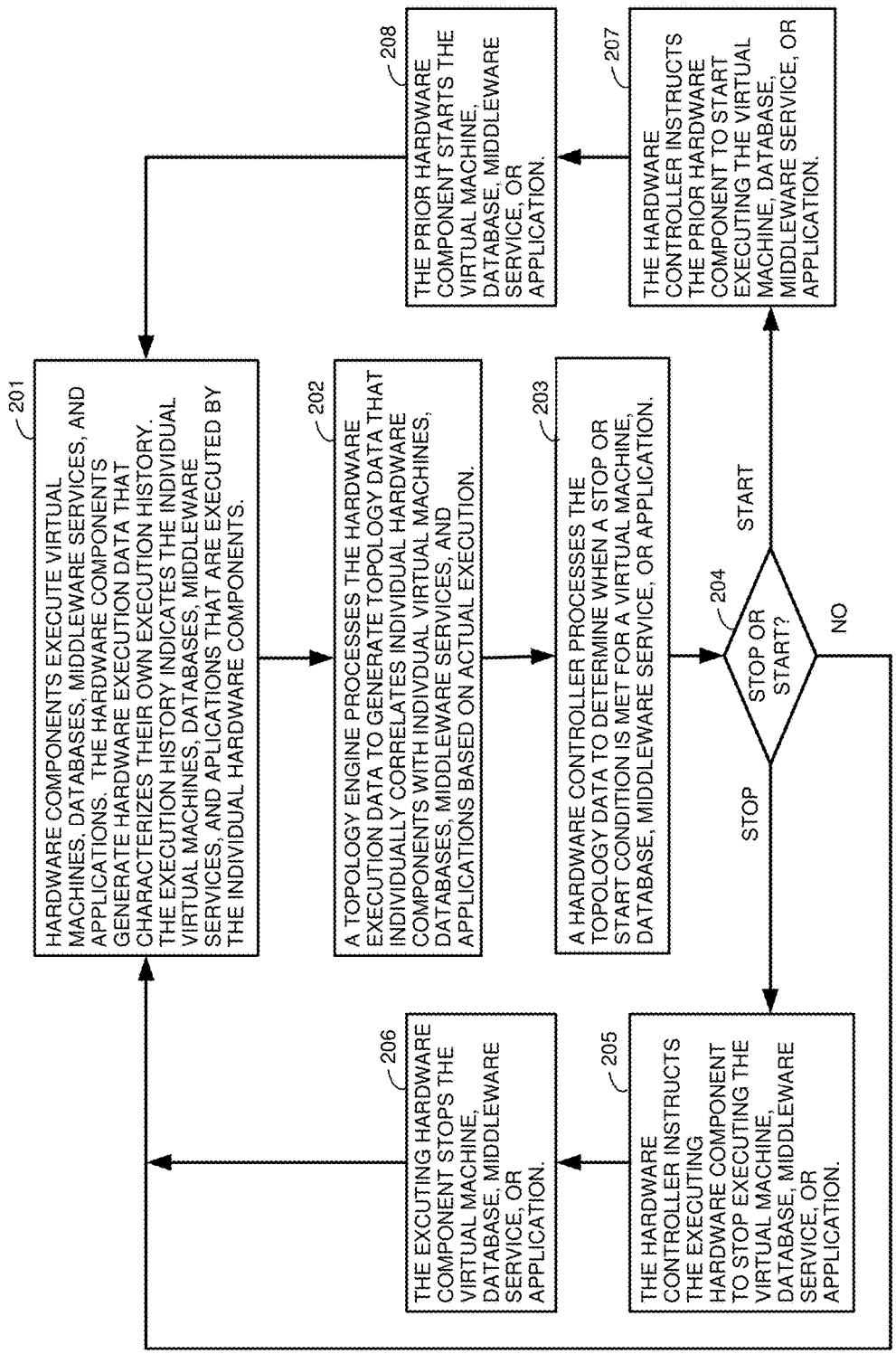
FIG. 2 illustrates the operation of a computer system to maintain computer system components using topology data in an exemplary embodiment.

FIG. 2 illustrates the operation of a computer system to maintain computer system components in an exemplary embodiment, although the computer system operation may vary in other embodiments. The hardware components execute virtual machines, databases, middleware services, and applications (201). The hardware components generate hardware execution data that characterizes their execution of these software components—usually during component start-up. The hardware execution data indicates the individual virtual machines, databases, middleware services, and applications that are executed by the individual hardware components.

A topology engine processes the hardware execution data to generate topology data (202). The topology data individually correlates hardware components, virtual machines, databases, middleware services, and applications based their actual execution as reported in the hardware execution data. The topology engine re-generates the topology data responsive to a change in the on/off status of a virtual machine, database, middleware service, or application.

A hardware controller processes the topology data to determine when a stop or start condition for is met for one of the virtual machines, databases, middleware services, or applications (203). When a stop condition is met (204), the hardware controller instructs the executing hardware component to stop that virtual machine, database, middleware service, or application (205). The executing hardware component stops the virtual machine, database, middleware service, or application responsive to the stop instruction from the hardware controller (206). The process repeats (201).

When a start condition is met (204), the hardware controller instructs the prior hardware component to start that virtual machine, database, middleware service, or application (207). The prior hardware component starts the virtual machine, database, middleware service, or application responsive to the start instruction from the hardware controller (208). The process repeats (201).

Figure 3:
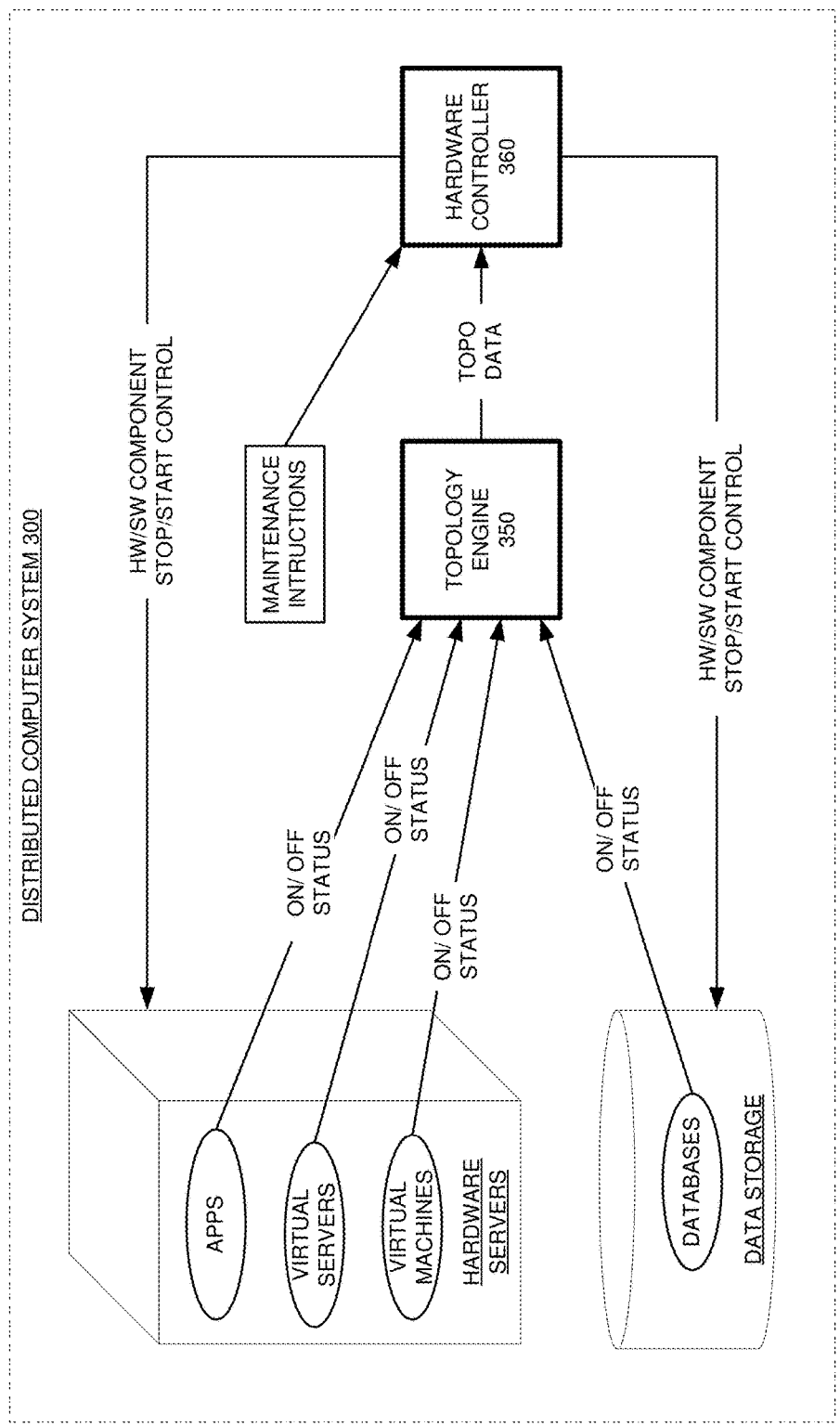
FIG. 3 illustrates a distributed computer system that maintains computer system components using topology data in an exemplary embodiment.

FIGS. 3-7 illustrate distributed computer system 300 that maintains computer system components using topology data in an exemplary embodiment, although the distributed computer system may vary in other embodiments. Distributed computer system 300 is an example of computer system 100, although system 100 may have alternative configurations and operations. Referring to FIG. 3, distributed computer system 300 comprises hardware servers, data storage, topology engine 350, and hardware controller 360. The hardware servers execute software components like applications (APPs), virtual servers, and virtual machines. The data storage executes software components like databases that interact with database applications and database servers that execute in the hardware servers.

The APPs call their operating systems or hypervisors to identify their hardware components and to send the their on/off status messaging. The applications transfer the on/off status messages to topology engine 350 during the execution of their start/stop scripts. In a like manner, the virtual servers, virtual machines, and databases also transfer their on/off status to topology engine 350. Topology engine 350 aggregates and formats the on/off status messaging from the various software components to form a topology data structure that is depicted by FIG. 6.

Hardware controller 360 receives maintenance instructions from operations personnel or another control computer. Hardware controller 360 accesses the topology data during the execution of the maintenance instructions to find select hardware and software components and to verify their on/off status. Responsive to the maintenance instructions and the topology data, hardware controller 360 transfers stop/start instructions for select hardware (HW) and/or software (SW) components.

The maintenance instructions drive hardware controller 360 to direct the orderly shutdown and restart of various computer system components. A set of applications may be stopped and then their supporting virtual servers and virtual machines are stopped before the supporting databases are finally stopped. During the shutdown, hardware reboots may be performed. Operating system or hypervisor reboots may be performed. The databases are then restarted followed by the virtual machines and virtual servers, and then the applications are restarted. This sequence is exemplary and various other sequences could be used.

Figure 4:
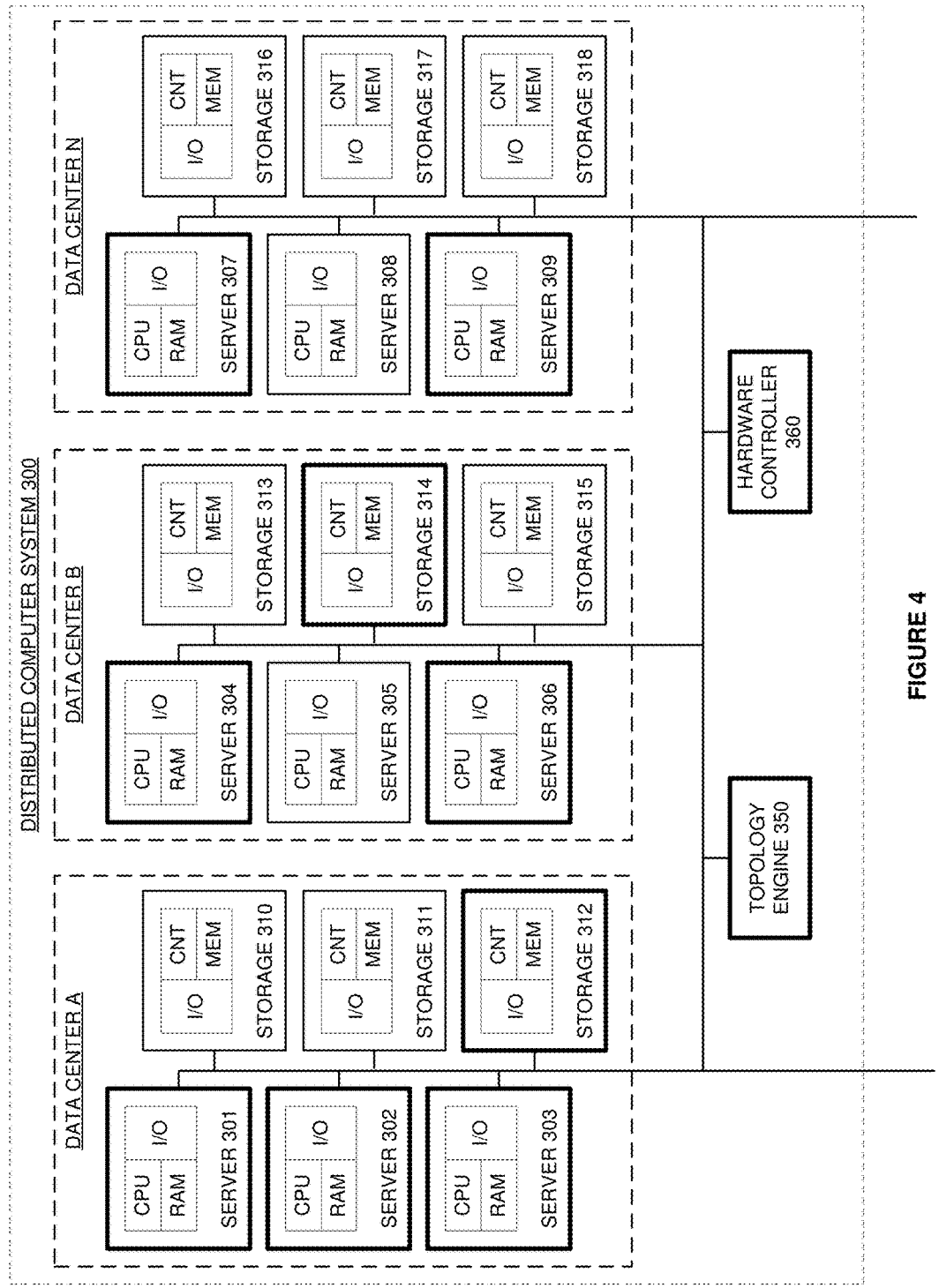
FIG. 4 illustrates a hardware architecture for the distributed computer system that maintains computer system components using topology data in an exemplary embodiment.

FIG. 4 illustrates a hardware architecture for distributed computer system 300 in an exemplary embodiment, although the hardware architecture may vary in other embodiments. Distributed computer system 300 comprises data centers A-N, topology engine 350, and hardware controller 360. Data center A has hardware servers 301-303 and data storage units 310-312. Data center B has hardware servers 304-306 and data storage units 313-315. Data center N has hardware servers 307-309 and data storage units 316-318. Hardware servers 301-309 comprise at least Central Processing Units (CPUs), Random Access Memory (RAM), and Input/Output transceivers (I/O). Data storage units 310-318 comprise at least Controllers (CNT), Data Memory (MEM), and I/O. The number of data centers, hardware servers, and data storage units has been restricted for clarity. The servers and storage units that are delineated in bold will be used in a shutdown example described below.

Figure 5:
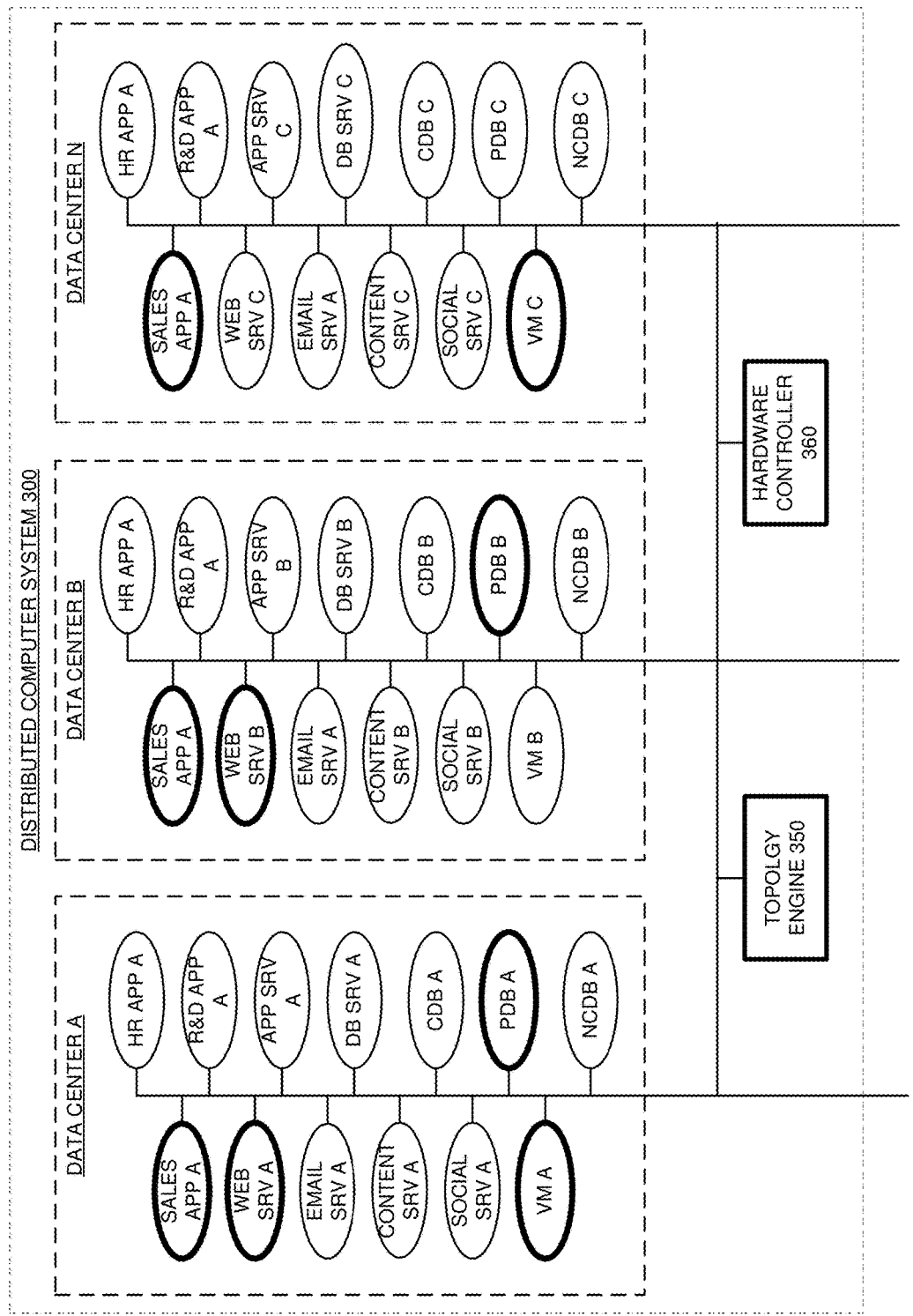
FIG. 5 illustrates a software architecture for the distributed computer system that maintains computer system components using topology data in an exemplary embodiment.

FIG. 5 illustrates a software architecture for distributed computer system 300 in an exemplary embodiment, although the software architecture may vary in other embodiments. Distributed computer system 300 again has data centers A-N, topology engine 350, and hardware controller 360. Data centers A-N each execute software like operating systems or hypervisors to support the execution of the other software components. The software components that are delineated in bold will be used in the shutdown example described below.

Data center A hosts the following software components: Human Resources (HR) application A, sales application (APP) A, Research & Development (R&D) application A, web server (SRV) A, application server A, email server A, Database (DB) access server A, content server A, Container DB (CDB) A, social networking server A, Pluggable DB (PDB) A, Virtual Machine (VM) A, and Non-Container DB (NCDB) A. Data center B hosts the following software components: HR application A, sales application A, R&D application A, web server B, application server B, email server A, DB server B, content server B, CDB B, social networking server B, PDB B, VM B, and NCDB B. Data center N hosts the following software components: HR application A, sales application A, R&D application A, web server C, application server C, email server A, DB server C, content server C, CDB C, social networking server C, PDB C, VM C, and NCDB C.

FIG. 6 illustrates topology data structure 600 for distributed computer system 300 in an exemplary embodiment, although the topology data structure may vary in other embodiments. The top row of topology data structure 600 indicates data center (DC), hardware component (HW), PDB, CDB, NCDB, email server, application server, DB server, web server, content server, social networking server, sales application, R&D application, and HR application. The data fields that are delineated in bold indicate hardware/software component pairs that will be used in the shutdown example described below.

The first column of topology data structure lists data centers A-N. The second column lists HW 301-318 as individually correlated to data centers A-N. The third column lists VM A in server 303, VM B in server 305, and VM C in server 309. The fourth column lists PDB A in storage 312, PDB B in storage 314, and PDB C in storage 318. The tenth column lists web server A in server 302, web server B in server 306, and web server C in server 307. The thirteenth column lists sales application A in servers 301, 304, and 307. For clarity, any data in the other fields is omitted.

Consider a simplified maintenance task with the following instructions: 1) find all hardware servers for sales application A, 2) stop sales application A and verify, 3) find web server A and web server B, 4) stop web server A and verify, 5) stop web server B and verify, 6) find VM A, 7) stop VM A and verify, 8) find PDB A and PDB B, 9) stop PDB A and verify, 10) stop PDB B and verify, 11) find VM C, 12) stop VM C and verify. Topology data structure 300 readily and accurately yields answers to these find instructions. Topology data structure 300 also provides fast and accurate on/off notifications for the verification instructions.

Figure 7:
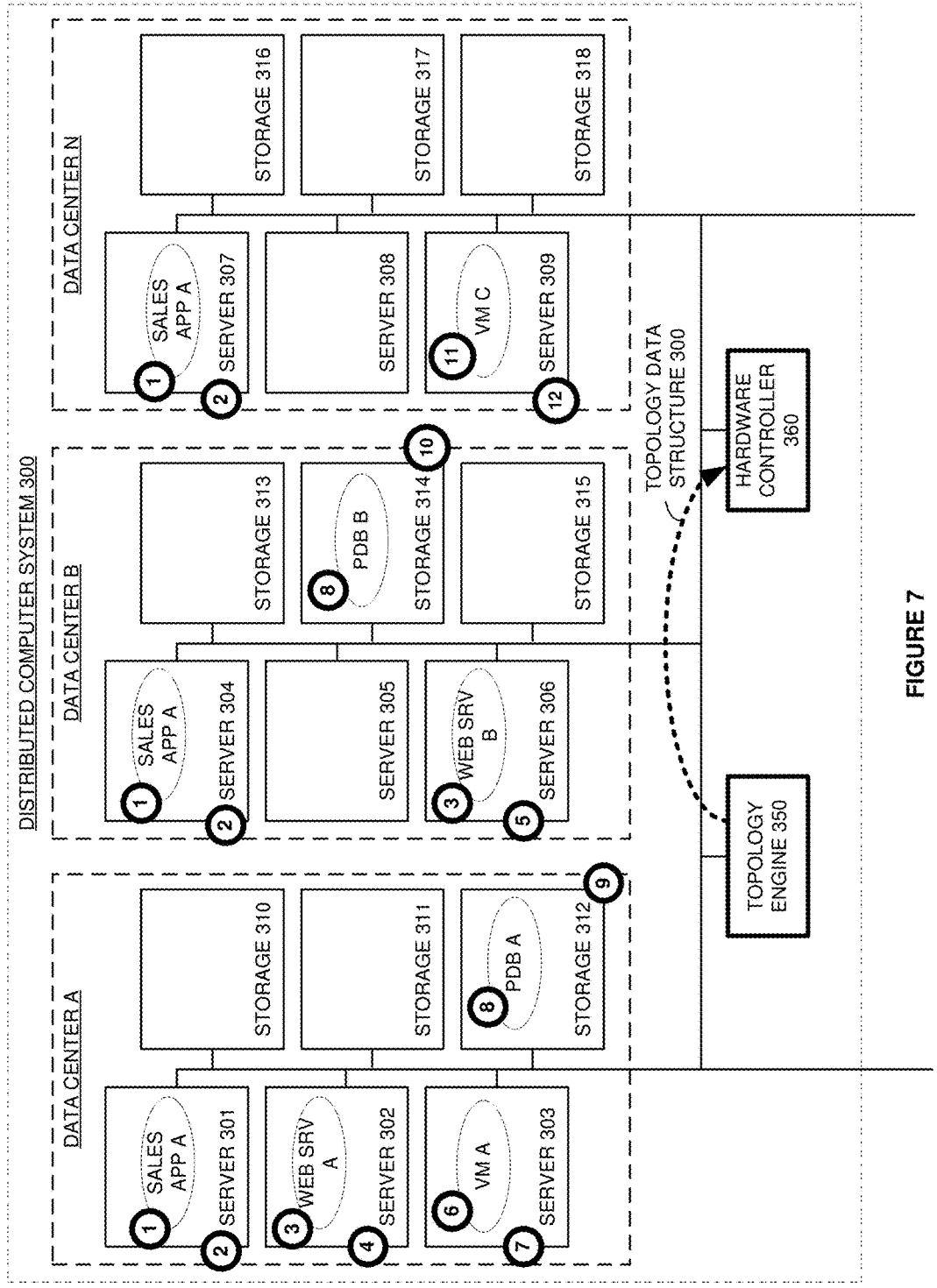
FIG. 7 illustrates a software component stop sequence for the distributed computer system that maintains computer system components using topology data in an exemplary embodiment.

FIG. 7 illustrates a software component stop sequence for distributed computer system 300 based on maintenance instructions in an exemplary embodiment, although the software architecture may vary in other embodiments. This sequence is exemplary as well and other sequences would likely be used. The exemplary maintenance instructions are 1) find all hardware servers for sales application A, 2) stop sales application A and verify, 3) find web server A and web server B, 4) stop web server A and verify, 5) stop web server B and verify, 6) find VM A, 7) stop VM A and verify, 8) find PDB A and PDB B, 9) stop PDB A and verify, 10) stop PDB B and verify, 11) find VM C, 12) stop VM C and verify. The performance of these maintenance instructions is indicated on FIG. 7 by circled numbers.

Maintenance instruction 1 is to find all hardware servers for sales application A. To perform maintenance instruction 1, hardware controller 360 accesses topology data structure with 300 with sales application A to yield servers 301, 304, and 307. Maintenance instruction 2 is to stop sales application A and verify the stoppage. To perform maintenance instruction 2, hardware controller 360 instructs servers 301, 304, and 307 to stop sales application A. Hardware controller 360 then accesses topology data structure 300 to verify that sales application A is stopped in servers 301, 304, and 307.

Maintenance instruction 3 is to find web server A and web server B. To perform maintenance instruction 3, hardware controller 360 accesses topology data structure 300 to yield server 302 for web server A and server 306 for web server B. Maintenance instruction 4 is to stop web server A and verify the stoppage. To perform maintenance instruction 4, hardware controller 360 instructs server 302 to stop web server A. Hardware controller 360 then accesses topology data structure 300 to verify that web server A is stopped in server 302. Maintenance instruction 5 is to stop web server B and verify the stoppage. To perform maintenance instruction 5, hardware controller 360 instructs server 306 to stop web server B. Hardware controller 360 then accesses topology data structure 300 to verify that web server B is stopped in server 306.

Maintenance instruction 6 is to find VM A. To perform maintenance instruction 6, hardware controller 360 accesses topology data structure 300 to yield server 303 for VM A. Maintenance instruction 7 is to stop VM A and verify the stoppage. To perform maintenance instruction 7, hardware controller 360 instructs server 303 to stop VM A. Hardware controller 360 then accesses topology data structure 300 to verify that VM A is stopped in server 303.

Maintenance instruction 8 is to find PDB A and PDB B. To perform maintenance instruction 8, hardware controller 360 accesses topology data structure 300 to yield storage 312 for PDB A and storage 314 for PDB B. Maintenance instruction 9 is stop PDB A and verify the stoppage. To perform maintenance instruction 9, hardware controller 360 instructs storage 312 to stop PDB A and verify the stoppage. Hardware controller 360 then accesses topology data structure 300 to verify that PDB A is stopped in storage 312. Maintenance instruction 10 is to stop PDB B and verify the stoppage. To perform maintenance instruction 10, hardware controller 360 instructs storage 314 to stop PDB B. Hardware controller 360 then accesses topology data structure 300 to verify that PDB B is stopped in storage 314.

Maintenance instruction 11 is to find VM C. To perform maintenance instruction 11, hardware controller 360 accesses topology data structure 300 to yield server 309 for VM C. Maintenance instruction 12 is to stop VM C and verify the stoppage. To perform maintenance instruction 12, hardware controller 360 instructs server 309 to stop VM C. Hardware controller 360 then accesses topology data structure 300 to verify that VM C is stopped in server 309.

The above maintenance instructions are sequenced so a step is completed before the next step is performed. Thus, hardware controller 360 determines when all requisite conditions are met before performing a step. This conditional sequencing enables the efficient and effective shut-down and start-up of various system components.

Figure 8:
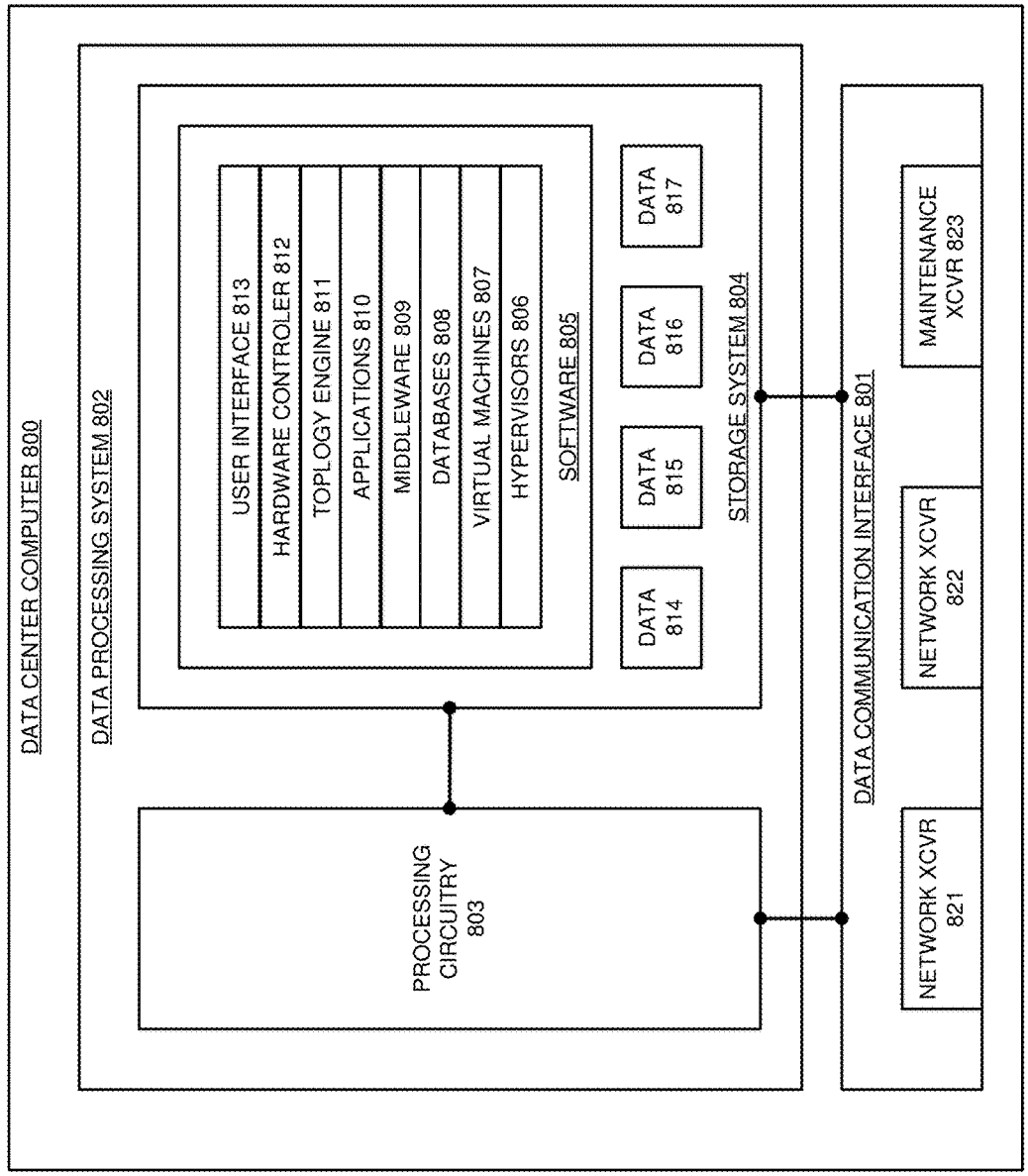
FIG. 8 illustrates a data center computer to maintain computer system components using topology data in an exemplary embodiment.

FIG. 8 illustrates data center computer 800 to maintain system components using topology data in an exemplary embodiment, although the data center computer may vary or be omitted in other embodiments. Data center computer 800 is an example of computer system 100, although system 100 may use alternative configurations and operations. Data center computer 800 comprises data communication interface 801 and data processing system 802. Data communication interface 801 comprises transceivers 821-823. Data processing system 802 comprises processing circuitry 803 and storage system 804. Storage system 804 stores software 805 and data 814-817. Software 805 includes respective software components 806-813.

Transceivers 821-823 comprise communication equipment, such as ports, bus interfaces, signal processors, memory, software, and the like. Processing circuitry 803 comprises central processing units, circuit boards, bus interfaces, integrated circuitry, and associated electronics. Storage system 804 comprises non-transitory, machine-readable, data storage media, such as flash drives, disc drives, memory circuitry, servers, and the like. Data 814-817 comprises both user data and system data like topography data structures.

Software 805 comprises machine-readable instructions that control the operation of processing circuitry 803 when executed. All or portions of software components 806-812 may be externally stored on one or more storage media, such as circuitry, discs, flash memory, and the like. Data center computer 800 may be centralized or distributed. Some conventional aspects of data center computer 800 are omitted for clarity, such as power supplies and enclosures.

When executed by processing circuitry 803, software components 806-812 direct circuitry 803 to perform the following operations. Hypervisors 806 interface between software components 807-812 and computer hardware (data communication interface 801, processing circuitry 803, storage system 804). Virtual machines 807 interface between hypervisors 806 and software components 809-813. Databases 808 store data 814-817 in storage system 804 and serve data 814-817 to software components 809-813. Middleware 809 comprises application servers, content servers, web servers, database servers, messaging servers, and social networking servers. Applications 810 support business/government data operations like human resources, sales, inventory, research & development, web sites, and the like.

Software components 807-810 report their on/off status to topology engine 811 during software component start and stop. Topology engine 811 aggregates the on/off status from many software components for hardware controller 812. Hardware controller 812 executes maintenance instructions that use the topology data to start and stop software components 807-810 by messaging hypervisors 806. User interface 813 drives a Graphic User Interface (GUI) that enables system personnel to view and edit the topology data and the maintenance instructions.

The above description and associated drawings teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method operating a computer system to maintain computer system components, the method comprising:
    a topology engine generating topology data to individually correlate hardware components, virtual machines, databases, middleware services, and applications based on hardware execution data;
    a hardware controller determining when a virtual machine stop condition for one of the virtual machines is met based on the topology data, and when the virtual machine stop condition is met, the hardware controller instructing the hardware components to stop the one of the virtual machines; and
    the hardware controller determining when a virtual machine start condition for the one of the virtual machines is met based on the topology data, and when the virtual machine start condition is met, the hardware controller instructing the hardware components to start the one of the virtual machines.

2. The method of claim 1 further comprising:
    the hardware components executing the virtual machines, the databases, the middleware services, and the applications;
    the hardware components generating the hardware execution data that characterizes the execution of the virtual machines, the databases, the middleware services, and the applications;
    the hardware components stopping the one of the virtual machines responsive to the virtual machine stop instruction from the hardware controller; and
    the hardware components starting the one of the virtual machines responsive to the virtual machine start instruction from the hardware controller.

3. The method of claim 1 wherein:
    the virtual machine stop condition comprises stopping at least one of the databases, the middleware services, or the applications; and
    the virtual machine start condition comprises starting at least one of the databases, the middleware services, or the applications.

4. The method of claim 1 further comprising:
    the hardware controller determining when a database stop condition for one of the databases is met based on the topology data, and when the database stop condition is met, the hardware controller instructing the hardware components to stop the one of the databases; and
    the hardware controller determining when a database start condition for the one of the databases is met based on the topology data, and when the database start condition is met, the hardware controller instructing the hardware components to start the one of the databases.

5. The method of claim 4 further comprising:
    the hardware components stopping the one of the databases responsive to the database stop instruction from the hardware controller; and
    the hardware components starting the one of the databases responsive to the database start instruction from the hardware controller.

6. The method of claim 4 wherein:
    the database stop condition comprises stopping at least one of the virtual machines, the applications, or the middleware services; and
    the database start condition comprises starting at least one of the virtual machines, the applications, or the middleware services.

7. The method of claim 1 wherein the topology engine generating the topology data comprises the topology engine re-generating the topology data responsive to the hardware components executing a new virtual machine, new database, new middleware service, or new application.

8. A computer system to maintain computer system components comprising:
    a topology engine configured to generate topology data to individually correlate hardware components, virtual machines, databases, middleware services, and applications based on hardware execution data;
    a hardware controller configured to determine when a virtual machine stop condition for one of the virtual machines is met based on the topology data, and when the virtual machine stop condition is met, to instruct the hardware components to stop the one of the virtual machines; and
    the hardware controller is configured to determine when a virtual machine start condition for the one of the virtual machines is met based on the topology data, and when the virtual machine start condition is met, to instruct the hardware components to start the one of the virtual machines.

9. The computer system of claim 8 further comprising:
    the hardware components configured to execute the virtual machines, the databases, the middleware services, and the applications;
    the hardware components configured to generate the hardware execution data that characterizes the execution of the virtual machines, the databases, the middleware services, and the applications;
    the hardware components configured to stop the one of the virtual machines responsive to the virtual machine stop instruction from the hardware controller; and
    the hardware components configured to start the one of the virtual machines responsive to the virtual machine start instruction from the hardware controller.

10. The computer system method of claim 8 wherein:
    the virtual machine stop condition comprises stopping at least one of the databases, the middleware services, or the applications; and
    the virtual machine start condition comprises starting at least one of the databases, the middleware services, or the applications.

11. The computer system of claim 8 further comprising:
the hardware controller configured to determine when a database stop condition for one of the databases is met based on the topology data, and when the database stop condition is met, to instruct the hardware components to stop the one of the databases; and
the hardware controller configured to determine when a database start condition for the one of the databases is met based on the topology data, and when the database start condition is met, to instruct the hardware components to start the one of the databases.

12. The computer system method of claim 11 further comprising:
the hardware components configured to stop the one of the databases responsive to the database stop instruction from the hardware controller; and
the hardware components configured to start the one of the databases responsive to the database start instruction from the hardware controller.

13. The computer system method of claim 11 wherein:
the database stop condition comprises stopping at least one of the virtual machines, the applications, or the middleware services; and
the database start condition comprises starting at least one of the virtual machines, the applications, or the middleware services.

14. The computer system method of claim 8 wherein the topology engine is configured to re-generate the topology data responsive to the hardware components executing a new virtual machine, new database, new middleware service, or new application.

15. A computer apparatus to maintain computer system components comprising:
a computer storage system configured to store topology processing instructions and maintenance processing instructions;
the topology processing instructions configured to direct computer processing circuitry to generate topology data to individually correlate hardware components, virtual machines, databases, middleware services, and applications based on hardware execution data; and
the maintenance processing instructions configured to direct the computer processing circuitry to determine when a virtual machine stop condition for one of the virtual machines is met based on the topology data, and when the virtual machine stop condition is met, to instruct the hardware components to stop the one of the virtual machines, and to direct the processing circuitry to determine when a virtual machine start condition for the one of the virtual machines is met based on the topology data, and when the virtual machine start condition is met, to instruct the hardware components to start the one of the virtual machines.

16. The computer apparatus of claim 15 wherein:
the virtual machine stop condition comprises stopping at least one of the databases, the middleware services, or the applications; and
the virtual machine start condition comprises starting at least one of the databases, the middleware services, or the applications.

17. The computer apparatus of claim 15 further comprising the maintenance processing instructions configured to direct the computer processing circuitry to determine when a database stop condition for one of the databases is met based on the topology data, and when the database stop condition is met, to instruct the hardware components to stop the one of the databases, and to direct the computer processing circuitry to determine when a database start condition for the one of the databases is met based on the topology data, and when the database start condition is met, to instruct the hardware components to start the one of the databases.

18. The computer apparatus of claim 15 wherein:
the database stop condition comprises stopping at least one of the virtual machines, the applications, or the middleware services; and
the database start condition comprises starting at least one of the virtual machines, the applications, or the middleware services.

19. The computer apparatus method of claim 15 wherein the topology processing instructions are configured to direct the computer processing circuitry to re-generate the topology data responsive to the hardware components executing a new virtual machine, new database, new middleware service, or new application.

20. The computer apparatus method of claim 15 wherein the maintenance processing instructions are configured to direct the computer processing circuitry to drive a Graphic User Interface (GUI) to display portions of the topology data.

* * * * *

UNITED STATES PATENT AND TRADEMARK OFFICE
CERTIFICATE OF CORRECTION

PATENT NO. : 10,452,429 B2  
APPLICATION NO. : 15/694322  
DATED : October 22, 2019  
INVENTOR(S) : Konnath et al.

Page 1 of 2

It is certified that error appears in the above-identified patent and that said Letters Patent is hereby corrected as shown below:

In the Drawings

On sheet 2 of 8, in FIGURE 2, under Reference Numeral 201, Line 8, delete "APLICATIONS" and insert -- APPLICATIONS --, therefor.

On sheet 2 of 8, in FIGURE 2, under Reference Numeral 204, Line 4, delete "INDIVDUAL" and insert -- INDIVIDUAL --, therefor.

On sheet 2 of 8, in FIGURE 2, under Reference Numeral 206, Line 1, delete "EXCUTING" and insert -- EXECUTING --, therefor.

On sheet 8 of 8, in FIGURE 8, under Reference Numeral 812, Line 1, delete "CONTROLER" and insert -- CONTROLLER --, therefor.

On sheet 8 of 8, in FIGURE 8, under Reference Numeral 811, Line 1, delete "TOPLOGY" and insert -- TOPOLOGY --, therefor.

In the Claims

In Column 10, Line 61, in Claim 10, delete "system method of" and insert -- system of --, therefor.

In Column 11, Line 12, in Claim 12, delete "system method of" and insert -- system of --, therefor.

In Column 11, Line 20, in Claim 13, delete "system method of" and insert -- system of --, therefor.

In Column 11, Line 27, in Claim 14, delete "system method of" and insert -- system of --, therefor.

Signed and Sealed this  
Sixteenth Day of February, 2021

Drew Hirshfeld  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 10,452,429 B2

In Column 12, Line 34, in Claim 19, delete "apparatus method of" and insert -- apparatus of --, therefor.

In Column 12, Line 40, in Claim 20, delete "apparatus method of" and insert -- apparatus of --, therefor.